United States Patent
Pyzik et al.

(10) Patent No.: US 7,879,126 B2
(45) Date of Patent: Feb. 1, 2011

(54) DIESEL PARTICULATE FILTER

(75) Inventors: Aleksander J. Pyzik, Midland, MI (US);
Robert A. Newman, Midland, MI (US);
Nicholas M. Shinkel, Bay City, MI (US)

(73) Assignee: Dow Global Technologies Inc., Midland, MI (US)

( * ) Notice: Subject to any disclaimer, the term of this patent is extended or adjusted under 35 U.S.C. 154(b) by 533 days.

(21) Appl. No.: 11/880,349

(22) Filed: Jul. 20, 2007

(65) Prior Publication Data

US 2008/0017573 A1   Jan. 24, 2008

Related U.S. Application Data

(60) Provisional application No. 60/832,740, filed on Jul. 21, 2006.

(51) Int. Cl.
*B01D 24/00* (2006.01)
*B01D 39/06* (2006.01)
*B01D 39/14* (2006.01)
*B01D 50/00* (2006.01)
*F01N 3/10* (2006.01)
*B01J 23/00* (2006.01)

(52) U.S. Cl. .......................... 55/526; 55/522; 55/524; 422/169; 422/170; 422/171; 422/172; 422/177; 422/178; 422/179; 422/180; 422/181; 422/182; 60/297; 502/303

(58) Field of Classification Search ............ 55/522–524; 422/172–180; 60/297, 169–172, 177–182; 502/303
See application file for complete search history.

(56) References Cited

U.S. PATENT DOCUMENTS

| | | | |
|---|---|---|---|
| 3,950,507 A | 4/1976 | Boreskov et al. | |
| 4,018,614 A * | 4/1977 | Nordlie | 501/104 |
| 4,276,071 A | 6/1981 | Outland | |
| 4,329,162 A | 5/1982 | Pitcher, Jr. | |
| 4,828,807 A | 5/1989 | Domesle et al. | |
| 4,857,089 A | 8/1989 | Kitagawa et al. | |
| 4,902,487 A | 2/1990 | Cooper et al. | |
| 4,994,419 A * | 2/1991 | Talmy et al. | 501/125 |
| 4,994,589 A | 2/1991 | Notermann | |
| 5,041,400 A * | 8/1991 | Talmy et al. | 501/125 |
| 5,098,455 A | 3/1992 | Doty et al. | |
| 5,132,256 A * | 7/1992 | Beall et al. | 501/95.2 |
| 5,447,291 A * | 9/1995 | Sandhage | 148/516 |
| 5,538,709 A | 7/1996 | Mohri et al. | |
| 5,698,483 A | 12/1997 | Ong et al. | |
| 5,817,588 A * | 10/1998 | Bachelard et al. | 501/127 |

(Continued)

FOREIGN PATENT DOCUMENTS

EP   327356   3/1995

(Continued)

*Primary Examiner*—Walter D Griffin
*Assistant Examiner*—Amber Orlando

(57) ABSTRACT

An improved particulate filtration system has an inlet, for the fluid to be filtered, connected to a housing containing a filter medium such that the fluid passes through the filter medium, and an outlet for the filtered fluid to exit. The filtration system's improvement is the filter medium being comprised of a porous ceramic of fused platelet grains. In a particular embodiment, the porous ceramic is a celsian porous ceramic, where the celsian grains have a hexagonal morphology and display a continuous volume thermal expansion coefficient from 100° C. to 1000° C.

14 Claims, 1 Drawing Sheet

U.S. PATENT DOCUMENTS

| | | | |
|---|---|---|---|
| 5,902,363 A * | 5/1999 | Connolly et al. | 55/487 |
| 5,939,354 A | 8/1999 | Golden | |
| 6,039,929 A * | 3/2000 | Lee et al. | 423/328.2 |
| 6,319,870 B1 * | 11/2001 | Beall et al. | 501/119 |
| 6,596,665 B2 | 7/2003 | Wallin et al. | |
| 6,953,554 B2 | 10/2005 | Wallin et al. | |
| 7,727,920 B2 * | 6/2010 | Oobuchi et al. | 501/125 |
| 2003/0138596 A1 | 7/2003 | Harada et al. | |
| 2004/0001782 A1 | 1/2004 | Kumar et al. | |
| 2004/0116276 A1 | 6/2004 | Yezerts et al. | |
| 2004/0151840 A1 * | 8/2004 | Wang et al. | 427/453 |
| 2005/0158534 A1 * | 7/2005 | Tabuchi et al. | 428/304.4 |
| 2006/0014971 A1 | 1/2006 | Yeates et al. | |
| 2007/0033912 A1 * | 2/2007 | Furukawa et al. | 55/523 |
| 2008/0226885 A1 * | 9/2008 | Oishi et al. | 428/219 |

FOREIGN PATENT DOCUMENTS

| | | |
|---|---|---|
| EP | 679611 B1 | 7/1999 |
| GB | 1014498 | 12/1965 |
| JP | 61-423 | 1/1986 |
| JP | 11-246280 | 9/1999 |
| JP | 2005298285 * | 10/2005 |
| WO | WO 99/03627 | 1/1999 |
| WO | WO 00/10913 | 4/1999 |

* cited by examiner

DIESEL PARTICULATE FILTER

CROSS-REFERENCE TO RELATED APPLICATIONS

This application claims the benefit of U.S. Provisional Application No. 60/832,740, filed Jul. 21, 2006.

FIELD OF THE INVENTION

The invention relates to particulate filters, such as diesel particulate filters.

BACKGROUND OF THE INVENTION

As air quality standards become more stringent, considerable efforts have focused on minimizing the particulate matter emitted in diesel engine exhaust. A potential solution is a particulate trap inserted in the exhaust system of a diesel engine.

A honeycomb ceramic wall-flow through filter, such as described by U.S. Pat. Nos. 4,276,071; 4,329,162 and 4,857,089; and 5,098,455, has become the preferred type of particulate trap. These honeycomb filters are made by extruding a paste comprised of water, binder and ceramic powders (for example, clay, talc, mullite, silica, silicon carbide and alumina) that form, for example, cordierite upon firing. Generally, the materials of choice for Diesel particulate filters have been cordierite, silicon carbide and mullite. Each of these, however, suffers from one or more problems.

In making ceramic honeycombs, clays, water soluble binders or combinations thereof are generally used to make the paste sufficiently plastic to form extruded useable honeycombs. After the paste is extruded, the honeycomb is dried, debindered and sintered to form a honeycomb. The honeycomb is heated to sinter or fused together the ceramic particulates or grains.

Even though cordierite has excellent thermal shock resistance due to its low thermal expansion coefficient, it suffers from a low use temperature, which may be exceeded when removing soot by combustion during the operation of a Diesel engine. In addition, cordierite because it is a result of a sintering process has tortuous porosity that leads to high pressure drops and as such limits the loading that can occur.

Silicon carbide, on the other hand, has good strength and high temperature resistance, but also suffers from high pressure drops due to similar porosity as cordierite. Silicon carbide also requires for it to have the good high temperature properties to be made without clay binders and as such are difficult to make into large parts requiring smaller extruded parts to be segmented and then assembled into larger filters. Lastly, silicon carbide even though it has reasonably good thermal shock resistance when the rate of temperature change is not too great due to its good thermal conductivity, still is prone to failure under rapid temperature changes due to its higher thermal expansion coefficient.

Mullite even though it has demonstrated good high temperature resistance, low pressure drops, high soot capture efficiency, it too has a high thermal expansion coefficient, which may be problematic in certain applications.

Accordingly, it would be desirable to provide a method for making wall-flow traps, for example, that avoids one or more of the problems of the prior art, such as one of those described above.

SUMMARY OF THE INVENTION

A first invention is an improved particulate filtration system comprised of a housing having a filter medium therein and an inlet and outlet to flow the fluid to be filtered through the filter medium, wherein the filter medium is comprised of a porous ceramic comprised of fused platelet ceramic grains. The invention is particularly useful for removal of soot particles from internal combustion engine exhaust streams (e.g., Diesel).

A second aspect of the invention is a method, which is particularly useful to make a preferred filter medium comprised of fused hexagonal celsian grains for use in the first aspect of the invention, the method comprising, (a) mixing precursors of celsian to form an admixture (b) heating the admixture for a time during the heating under an atmosphere containing silicon tetrafluoride to form a fluorine containing intermediate (c) heating the fluorine containing intermediate in an atmosphere substantially devoid of fluorine to form the filtration medium comprised of fused hexagonal celsian grains. Surprisingly, the celsian made by the method of the second aspect of the invention is able to produce an asymmetric grained celsian ceramic that does not display a discontinuous change in volume around 300° C. due to a low temperature phase change associated with the low temperature stable monoclinic phase of celsian changing to the higher temperature stable hexagonal phase.

A third aspect of the invention is an improved celsian ceramic comprised of fused celsian ceramic grains wherein the celsian ceramic has a thermal expansion coefficient that is continuous between 100° C. to 1000° C. Continuous means that there is not a sudden volume change due to a phase change of the celsian grains. It is believed that such continuous expansion may be due to the celsian grains having a heretofor unknown defect structure that impedes the phase change that normally occurs around 300° C.

DETAILED DESCRIPTION OF THE INVENTION

Figure 1:
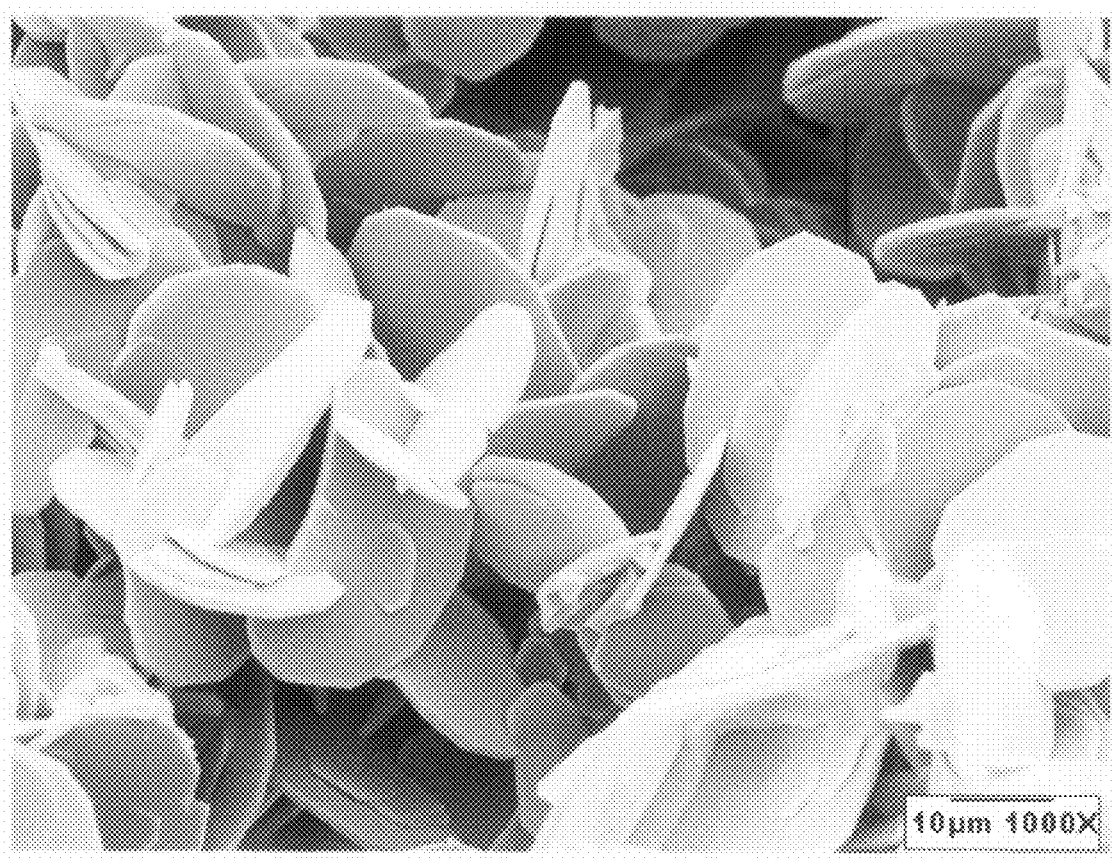
FIG. 1 is a scanning electron micrograph of a celsian filter medium of the invention.

With regard to the first aspect of the invention, the filtration system may have any suitable inlet, housing, and outlet such as those known in the art such as described for filtration of Diesel exhaust described in U.S. Pat. Appl. 2004/0116276; 2004/0001782 and U.S. Pat. Nos. 4,828,807; 4,902,487 and GB Pat. No. 1,014,498.

The filter medium of the filtration system is comprised of a porous ceramic of fused platelet grains. The ceramic grains of the porous ceramic are fused with each other to form the filter medium. "Fused" means that the grains are bonded together by ceramic bonds for example by sintering. For example, the grain boundary between grains is comprised of a ceramic such as a glass.

The filter medium is porous (i.e., a porous ceramic). Because of the unique structure of the platelet ceramic grains, the porous filter medium may have a strength suitable for catalytic diesel soot filtration, while having a porosity of at least about 40 percent by volume. Preferably, the porosity is at least about 50 percent, more preferably at least about 60 percent and most preferably at least about 65 percent, to, generally, at most about 85 percent by volume of the filter medium.

It is also preferred for the porosity to be substantially all open porosity. Open porosity is porosity that is accessible to a liquid or gas (i.e., can be penetrated by a liquid or gas). In other words, the open porosity is not closed or entrapped. Preferably, this open porosity is continually interconnected throughout the support, which generally occurs when the platelet grains are randomly oriented. "Substantially all," in this context, means that the catalyst support contains at most about 5 percent closed porosity out of the total amount of porosity of the catalyst support. Preferably, the amount of closed porosity is at most about a trace amount. Preferably, most of the closed porosity is comprised of pores within individual grains (i.e., not pores defined by the surfaces of more than one grain). The open and closed porosity may be measured by a suitable technique, such as those known in the art.

For applications involving thermal cycling such as Diesel exhaust filtration, the porous ceramic desirably has a low volume thermal expansion coefficient of at most 8 ppm/° C. at the temperature used such as from 0-1000° C. (ppm=parts per million). Preferably the maximum volume thermal expansion coefficient is at most 6 ppm/° C., more preferably at most 4 ppm/° C. and most preferably at most 3 ppm/° C.

Likewise, the volume thermal coefficient of expansion is preferably continuous at the use temperatures of the application. Illustratively, a Diesel particulate filter desirably has a continuous volume thermal expansion coefficient from 100° C.-1000° C. To reiterate, continuous means that the expansion coefficient does not undergo a step change (discontinuity) for example due to a change in crystal structure.

Platelet grain means a grain that has a maximum (e.g., length) dimension, a dimension (e.g., width) orthogonal to the maximum dimension that is within at least 0.7 times the size of the maximum dimension and a minimal (e.g., thickness) dimension that is at most 0.2 times the maximum dimension. Illustratively, a hexagonal platelet (symmetric hexagonal face with a thin thickness) grain has a maximum (length) dimension from point to point of the hexagonal face of D, a width dimension orthogonal to the length dimension on the face (width) that is 0.866 D and a thickness (dimension orthogonal to length and width that is at most about 0.2 times the maximum dimension (length). Preferably, the thickness is at most about 0.15 times the length and most preferably at most about 0.1 times the length. The face (area lying in the plane of the length and width) of the platelet grain may have any shape irregular or regular, symmetric or asymmetric so long as it is a platelet grain as described above. Preferably, the face shape is hexagonal in nature.

The platelet ceramic grain's length dimension is generally, at least about 1 micrometer to at most about 2 millimeters. Preferably, the length is at least about 10 micrometers, more preferably at least about 20 micrometers and most preferably at least about 100 micrometers, to preferably at most about 1.5 millimeters, more preferably at most about 1 mm, and most preferably at most about 500 micrometers.

The ceramic grains may be of any useful ceramic composition. Generally, the ceramic grains are oxides. Preferably, the ceramic is an aluminosilicate. A particularly preferred aluminosilicate is celsian, which is a barium containing aluminosilicate having the general formula $BaO.Al_2O_3.2SiO_2$. It is understood that the porous ceramic may be composed of ceramic grains that have differing chemical composition and crystalline phases. For example, the porous ceramic may have celsian grains and other grains such as aluminates. Most preferably, the ceramic grains are substantially celsian grains. Substantially means that at least about 50% by volume of the ceramic grains are of a celsian composition. Preferably the amount of celsian grains in the filter medium is at least about 75%, more preferably at least about 90% and most preferably at least about 95% by volume. In a most preferred embodiment, essentially all of the grains are celsian grains. The type of grains may be determined by any suitable technique or techniques, such as electron diffraction, X-ray diffraction and energy dispersive spectroscopy.

The filter medium may have a catalyst to mitigate gaseous pollutants or aid in the combustion of captured particulates to regenerate the filter medium such as is typical in a Diesel exhaust. The catalyst may be any useful for a particular application, for example, such as those known in the art for internal combustion exhaust catalysis. Examples of catalysis that may be useful are described in the following paragraphs.

A first exemplary catalyst is directly a bound-metal catalyst, such as noble metals, base metals and combinations thereof. Examples of noble metal catalysts include platinum, rhodium, palladium, ruthenium, rhenium, silver and alloys thereof. Examples of base metal catalysts include copper, chromium, iron, cobalt, nickel, zinc, manganese, vanadium, titanium, scandium and combinations thereof. The metal catalyst, preferably, is in the form of a metal, but may be present as an inorganic compound, such as an oxide, nitride and carbide, or as a defect structure within the ceramic grains of the porous catalyst support. The metal may be applied by any suitable technique, such as those known in the art. For example, the metal catalyst may be applied by chemical vapor deposition.

A second exemplary catalyst is one that is incorporated into the lattice structure of the ceramic grains of the aforementioned catalyst honeycomb. For example, an element may be Ce, Zr, La, Mg, Ca, a metal element described in the previous paragraph or combinations thereof. These elements may be incorporated in any suitable manner, such as those known in the art.

A third exemplary catalyst is a combination of ceramic particles having metal deposited thereon. These are typically referred to as wash-coats. Generally, wash-coats consist of micrometer-sized ceramic particles, such as zeolite, aluminosilicate, silica, ceria, zirconia, barium oxide, barium carbonate and alumina particles that have metal deposited thereon. The metal may be any previously described for directly deposited metal. A particularly preferred wash-coat catalyst coating is one comprised of alumina particles having a noble metal thereon. It is understood that the wash-coat may be comprised of more than one metal oxide, such as alumina, having oxides of at least one of zirconium, barium, lanthanum, magnesium and cerium.

A fourth exemplary catalyst is a perovskite-type catalyst comprising a metal oxide composition, such as those described by Golden in U.S. Pat. No. 5,939,354.

A fifth exemplary catalyst is one that is formed by and deposited on the catalyst support by calcining at a temperature of from 300° C. to 3000° C., a composition that comprises (a) an aqueous salt solution containing at least one metal salt and (b) an amphiphilic ethylene oxide containing copolymer, wherein the copolymer has an average molecular weight of greater than 400, an ethylene oxide content of 5 to 90 percent and an HLB of between −15 and 15, as described by Gruenbauer, et al., PCT Patent Application No. WO99/

18809. In addition, the catalyst may also be one as described by U.S. Pat. No. 5,698,483 and PCT Patent Application No. WO99/03627.

To reiterate, a preferred embodiment of the invention is when the porous ceramic is celsian wherein the celsian ceramic has a volume thermal expansion coefficient that is continuous between 100° C. to 1000° C. Such a celsian has been discovered to be possible by making celsian by a method comprising, (a) mixing precursors of celsian to form an admixture, (b) heating, to form an intermediate containing fluorine, the admixture for a time during the heating under an atmosphere containing silicon tetrafluoride, and (c) subsequently heating the fluorine containing intermediate in an atmosphere substantially devoid of fluorine to form the hexagonal celsian ceramic.

The precursor may be any combination of metals or metal compounds in the proper proportion to make celsian such as oxides, carbonates, acetates, fluorides, and silcates. Preferably, the precursors are metal oxides, carbonates or combinations thereof. In a preferred embodiment, the precursors are barium carbonate, silica and alumina.

The mixing may be any suitable method to form the admixture, such as those known in the art.

The admixture may be, if desired, shaped into a porous shape by any suitable method, using for example, known methods and additives to do so. Examples include injection molding, extrusion, isostatic pressing, slip casting, roll compaction and tape casting. Each of these is described in more detail in *Introduction to the Principles of Ceramic Processing*, J. Reed, Chapters 20 and 21, Wiley Interscience, 1988.

The admixture may be heated to a temperature for a time sufficient to convert the precursor compounds in the admixture to the fluorine containing intermediate (intermediate heating) and then cooled and subsequently heated (final heating) to form the hexagonal celsian ceramic. Preferably, the intermediate heating is followed by the final heating without cooling in the same furnace. The process of heating may also be cycled between the intermediate and final heating. Typically, the intermediate phases are alumina, celsian and variety of Ba—Al—F phases which on subsequent heating typically transform into more celsian, $BaAl_2O_4$ and $BaAl_{12}O_{19}$ and residual alumina. There may also be, depending on starting composition and process conditions, monoclinic celsian present in an amount of up to 10% by volume, but the presence of monoclinic celsian is not preferred.

Generally, the intermediate heating is to a temperature from 500° C. to 1100° C. Preferably the intermediate heating temperature is at least 550° C., more preferably at least 650° C. and most preferably at least 725° C. to preferably at most 1100° C., more preferably at most 1000° C. and most preferably at most 950° C. The time at temperature may be any amount of time sufficient to form the intermediate. Generally, the time at temperature is from 2 minutes to 4 days. In increasing preference, the time at temperature is at least 5, 10, 20, 30, 45 minutes and 60 minutes. In increasing preference, the time at temperature is at most about 2 days, 1 day, 12 hours, 6 hours, 4, hours and 3 hours.

The gas pressure during the intermediate heating may be any suitable, but, generally, for practical reasons is less than 10 atmospheres of pressure, preferably less than 2 atmosphere to generally at least about 50 Torr, preferably at least about 100 Torr, more preferably at least about 200 Torr and most preferably at least about 400 Torr.

The silicon tetrafluoride may be provided during the intermediate heating by flowing a gas into the furnace or may occur from the decomposition of precursor compounds containing fluorine such as $AlF_3$ that subsequently react with Si containing precursor compounds (e.g., $SiO_2$) in a similar manner as described by U.S. Pat. No. 4,910,172. Preferably, the silicon tetrafluoride is provided as a separate gas. The silicon tetrafluoride may be provided solely or in combination with other gases that do not affect the formation of the intermediate. Suitable other gases include noble gases, oxygen and nitrogen. It is preferred that the silicon tetrafluoride is provided as a flowing gas as opposed to a static overpressure of gas.

During the intermediate heating, the atmosphere may be inert to start (for example, nitrogen) or a vacuum until at least 500° C., which is when the fluorine containing gas is preferably introduced. During heating to the intermediate temperature, organic compounds and water, which may have been used to shape the admixture, may be removed. These may also be removed in a separate heating step common in the art described in *Introduction to the Principles of Ceramic Processing*, J. Reed, Wiley Interscience, 1988.

The final heating temperature may be any temperature suitable depending, for example, on variables such as the precursors used and intermediate heating conditions. Generally, the final heating temperature is at least 1000° C. to at most 1700° C. Preferably the final temperature is at least 1050° C., more preferably at least 1075° C. and most preferably at least 1100° C. to preferably at most 1600° C., more preferably at most 1550° C., and most preferably at most 1500° C.

The atmosphere is devoid of fluorine to the extent necessary so that fluorine is removed to form the celsian ceramic during the final heating. In other words, devoid of fluorine does not mean that there is absolutely no fluorine present, because there will naturally be some present as the fluorine containing intermediate forms the celsian ceramic, but that the atmosphere that is provided does not intentionally contain fluorine. Without constraining to an absolute amount, generally the amount of fluorine in the provided gas is at most about 1000 ppm. In ascending preference the amount of fluorine in the gas is at most about 500 ppm, 250 ppm, 100 ppm, 50 ppm, 25 ppm, 10 ppm and most preferably an undetectable amount of fluorine (i.e., zero for all practical purposes). The atmosphere may be a vacuum, dry or humid air, nitrogen or an inert gas such as a noble gas. Preferably, the atmosphere is ambient or humid air. The atmosphere is also preferably a flowing gas or one that is cycled from vacuum and then backfilled with gas.

The time at the final heating temperature may be any as described for the intermediate heating.

The celsian porous ceramic in addition to be useful for the filter medium of the filtration system of the present invention, may also be used in other applications where porous ceramics are used such as substrates for infiltrating metals or plastic to make composites, liquid filtration, insulation, and the like.

EXAMPLES

Example 1

Sixty parts by weight of kappa alumina 6-15 micron powder (Selecto Scientific, Georgia) was mixed with 40 parts by weight of barium carbonate 99.8%, 1 micron powder (Alpha Aesar, Ward Hill, Mass.), pressed into pellets and heated under 600/500 torr $SiF_4$ pressure in a quartz reactor for about 4 hours. The (intermediate) phases present after the heating under $SiF_4$ were celsian, alumina and Ba—Al—F phases. Next, the samples were heat-treated in air at 1400° C. for two hours. The resulting composition consisted of 65.8% hexagonal celsian, 3.4% $Al_2O_3$, 4.9% $BaAl_2O_4$ and 25.9% $BaAl_{12}O_{19}$ by weight. No monoclinic celsian was detected. The microstructure was almost entirely plate-like which suggest that both main phases—celsian and barium aluminate were in the form of platelets. These platelets were typically 30-50 microns in diameter and 1-5 microns in thickness. The final hexagonal celsian ceramic was comprised of fused platelet grains as shown in FIG. 1, was about 60% porous and had an average pore size of about 10 microns.

Example 2

Kappa $Al_2O_3$, barium carbonate, silica 99.5%, 2 micron powder, (Alpha Aeser) were mixed together to form a mixture. In the mixture, the ratio of Al/Si was 3:1. The amount of barium carbonate was 30% by weight of the total mixture. The mixture was pressed into pellets and reacted under 500/600 torr $SiF_4$ pressure for about 4 hours and then heat-treated in air at 1400° C. for 2 hours. The fused platelet ceramic (63% porosity) had about 70% hexagonal celsian and 30% unreacted alpha alumina by weight. The body displayed a thermal expansion that lacked a discontinuity at 300° C. The coefficient of thermal expansion was 4.2 (at 200° C.), 4.5 (at 500° C.) and 5.5 (at 1000° C.)×$10^{-6}$ ppm/° C.

Example 3

Kappa $Al_2O_3$, barium carbonate and silica were mixed together to form a mixture. In the mixture, the ratio of Al/Si was 3:1. The amount of barium carbonate was 40% by weight of the total mixture. The mix was processed as described in Example 2. After completion, the porosity was about 60-62%, strength was about 17 MPa (4-point bend test ASTM C1421-99) and modulus was about 23 GPa (ASTM C1259-94). The body consisted of 27% $Al_2O_3$, 69% hexagonal celsian and 3% of $BaAl_{12}O_{19}$ by weight.

Thermal cycling was conducted to determine this Example's resistance to thermal shock. Four-point bend bars of this Example's composition were subjected to 10 heating and cooling cycles from 200° C. to 500° C. and back again at a heating and cooling rate of 10° C. per minute. Breaking these bars after 10 cycles showed no statistically significant strength reduction or change in modulus compared to bars not subject to the heating and cooling cycles.

The following Claims, even though they may not explicitly depend from one another, any combination of the embodiments of any one claim combined with any one or more claims is contemplated by the invention.

What is claimed is:

1. An improved particulate filtration system comprised of a housing having a filter medium therein and an inlet and outlet to flow the fluid to be filtered through the filter medium, wherein the filter medium is comprised of a porous ceramic comprised of fused platelet celsian grains having a continuous thermal expansion coefficient from 100° C. to 1000° C., the platelet celsian grains having a crystalline structure that is hexaganol celsian.

2. The filtration system of claim 1 wherein the porous ceramic has a maximum volume thermal expansion coefficient of at most 8 ppm/° C.

3. The filtration system of claim 2 wherein the porous ceramic has a maximum thermal expansion coefficient of at most 6 ppm/° C.

4. The filtration system of claim 3 wherein the porous ceramic has a maximum thermal expansion coefficient of at most 4 ppm/° C.

5. The filtration system of claim 4 wherein the porous ceramic has a thermal expansion coefficient of at most 3 ppm/° C.

6. The filtration system of claim 1 wherein the filtration system is incorporated in a Diesel engine exhaust.

7. The filtration system of claim 6, wherein the fused celsian platelet grains are at least 50% by volume grains that are of the hexaganol celsian phase.

8. The filtration system of claim 7, wherein fused celsian platelet grains are at least 75% by volume grains that are of the hexaganol celsian phase.

9. A method of forming a filter comprised of fused ceramic platelet grains that are comprised of hexagonal celsian grains formed by a method comprising,
    (a) mixing precursors of celsian to form an admixture,
    (b) heating the admixture under an atmosphere containing silicon tetrafluoride to form an intermediate containing fluorine, wherein the silicon tetrafluoride is provided as a separate gas, and
    (c) subsequently heating the fluorine containing intermediate in an atmosphere devoid of fluorine to form the hexaganol celsian ceramic, wherein the hexaganol celsian is in the form of platelet grains that have a continuous thermal expansion coefficient from 100° C. to 1000° C.

10. The filtration system of claim 9, wherein the silicon tetrafluoride is provided from the decomposition of a precursor compound.

11. A porous celsian ceramic comprised of fused hexagonal celsian ceramic grains wherein the celsian ceramic has a thermal expansion coefficient that is continuous between 100° C. to 1000° C.

12. The porous celsian ceramic of claim 11, wherein the celsian ceramic has a porosity of at least about 30%.

13. The porous celsian ceramic of claim 12, wherein the celsian ceramic has a porosity of at least about 50%.

14. The porous celsian ceramic of claim 13, wherein the porosity is at least 60%.

* * * * *